(12) United States Patent
Bridgelall et al.

(10) Patent No.: US 10,305,176 B2
(45) Date of Patent: May 28, 2019

(54) CONFORMAL ANTENNAS FOR UNMANNED AND PILOTED VEHICLES AND METHOD OF ANTENNA OPERATION

(71) Applicants: University of North Dakota, Grand Forks, ND (US); NDSU Research Foundation, Fargo, ND (US)

(72) Inventors: Raj Bridgelall, Planno, TX (US); Michael Corcoran, Grand Forks, ND (US)

(73) Assignees: University of North Dakota, Grand Forks, ND (US); NDSU Research Foundation, Fargo, ND (US)

( * ) Notice: Subject to any disclaimer, the term of this patent is extended or adjusted under 35 U.S.C. 154(b) by 646 days.

(21) Appl. No.: 14/716,288

(22) Filed: May 19, 2015

(65) Prior Publication Data

US 2015/0340759 A1  Nov. 26, 2015

Related U.S. Application Data

(60) Provisional application No. 62/000,753, filed on May 20, 2014.

(51) Int. Cl.
| | |
|---|---|
| *B64C 1/36* | (2006.01) |
| *H01Q 1/27* | (2006.01) |
| *H01Q 1/28* | (2006.01) |
| *H01Q 3/26* | (2006.01) |
| *H04B 7/06* | (2006.01) |
| *B64D 43/00* | (2006.01) |
| *H04B 7/185* | (2006.01) |

(52) U.S. Cl.
CPC ............ *H01Q 1/286* (2013.01); *B64C 1/36* (2013.01); *B64D 43/00* (2013.01); *H01Q 1/27* (2013.01); *H01Q 3/26* (2013.01); *H04B 7/0617* (2013.01); *H04B 7/18504* (2013.01)

(58) Field of Classification Search
CPC ............ H01Q 1/286; H01Q 1/27; H01Q 3/26; H01Q 1/18; H01Q 1/276; H01Q 1/28; H01Q 1/185; H01Q 1/288; H01Q 21/0025; H01Q 1/2291; H01Q 1/38; B64C 1/36; B64D 43/00; H04B 7/0617; H04B 7/18504; H04B 7/18506; H04W 4/046; G01S 13/765; G06K 19/07762
USPC .......................................................... 342/368
See application file for complete search history.

(56) References Cited

U.S. PATENT DOCUMENTS 3,673,044 A    6/1972  Miller et al.
5,471,220 A *  11/1995  Hammers .......... H01Q 21/0025
                                                 342/372

(Continued)

FOREIGN PATENT DOCUMENTS

CN          103493289 A *  1/2014  ............. H01Q 1/246
WO   WO-2009036305 A1 *  3/2009  ............. H01Q 1/28

(Continued)

*Primary Examiner* — Bernarr E Gregory
*Assistant Examiner* — Nuzhat Pervin
(74) *Attorney, Agent, or Firm* — Kinney & Lange, P.A.

(57) ABSTRACT

A vehicle includes a body providing structural support and defining a fuselage perimeter and including a plurality of bands, a plurality of antennas integrated into the plurality of bands, and a transceiver operatively connected to each of the plurality of antennas. The transceiver is configured to power selected sub-sets of the plurality of antennas to generate a directional antenna beam.

6 Claims, 10 Drawing Sheets

(56) References Cited

U.S. PATENT DOCUMENTS

| | | | |
|---|---|---|---|
| 6,377,216 B1 | 4/2002 | Cheadle et al. | |
| 6,606,055 B2* | 8/2003 | Halsema | H01Q 1/28 342/368 |
| 6,888,502 B2* | 5/2005 | Beigel | G06K 19/07762 340/572.7 |
| 7,046,209 B1 | 5/2006 | McCarville et al. | |
| 7,109,943 B2 | 9/2006 | McCarville et al. | |
| 7,545,322 B2* | 6/2009 | Newberg | H01Q 1/276 342/372 |
| 7,548,205 B2* | 6/2009 | Mohamadi | G01S 13/765 343/700 MS |
| 7,889,142 B1 | 2/2011 | Westman | |
| 8,022,307 B2 | 9/2011 | Chu et al. | |
| 8,116,762 B2* | 2/2012 | Soliman | H04B 7/18506 455/12.1 |
| 8,230,581 B1 | 7/2012 | Wilcoxon et al. | |
| 8,332,053 B1 | 12/2012 | Patterson et al. | |
| 8,352,105 B2 | 1/2013 | Barnes et al. | |
| 8,405,561 B2 | 3/2013 | Handy et al. | |
| 8,418,642 B2 | 4/2013 | Vosburgh | |
| 8,422,951 B2* | 4/2013 | Nejad | H04W 4/046 455/41.2 |
| 8,525,729 B1* | 9/2013 | Martin | H01Q 1/38 343/700 MS |
| 8,676,192 B2* | 3/2014 | Jalali | H01Q 1/2291 455/432.1 |
| 8,847,823 B2 | 9/2014 | Vos et al. | |
| 8,922,436 B2 | 12/2014 | Stone et al. | |
| 8,963,789 B2 | 2/2015 | Chang et al. | |
| 8,983,455 B1 | 3/2015 | Frolov et al. | |
| 9,014,885 B2 | 4/2015 | Barnes et al. | |
| 2002/0118137 A1* | 8/2002 | Halsema | H01Q 1/28 343/705 |
| 2006/0082516 A1* | 4/2006 | Strickland | H01Q 1/288 343/872 |
| 2008/0030404 A1* | 2/2008 | Irwin | H01Q 1/276 342/372 |
| 2008/0169988 A1 | 7/2008 | Deatt et al. | |
| 2008/0218416 A1 | 9/2008 | Handy et al. | |
| 2009/0008507 A1 | 1/2009 | Pearson | |
| 2010/0177011 A1 | 7/2010 | Sego et al. | |
| 2010/0188304 A1* | 7/2010 | Clymer | H01Q 1/185 343/753 |
| 2010/0328169 A1 | 12/2010 | Collette et al. | |
| 2011/0122029 A1 | 5/2011 | Bonwit et al. | |
| 2013/0016019 A1 | 1/2013 | Stoneback et al. | |
| 2013/0176176 A1 | 7/2013 | Vos et al. | |
| 2013/0249748 A1 | 9/2013 | Togura et al. | |
| 2013/0285864 A1* | 10/2013 | Clymer | H01Q 1/185 343/753 |
| 2014/0022139 A1* | 1/2014 | Rao | H01Q 1/48 343/841 |
| 2014/0049879 A1 | 2/2014 | Snyder et al. | |
| 2014/0268607 A1 | 9/2014 | Wicker et al. | |
| 2014/0306851 A1 | 10/2014 | Hall et al. | |
| 2014/0327577 A1* | 11/2014 | Ozaki | H01Q 3/26 342/367 |
| 2015/0249362 A1 | 9/2015 | Bridgelall et al. | |

FOREIGN PATENT DOCUMENTS

| | | | |
|---|---|---|---|
| WO | WO2012/106021 A1 | 8/2012 | |
| WO | WO-2015001425 A2 * | 1/2015 | H01Q 1/28 |

* cited by examiner

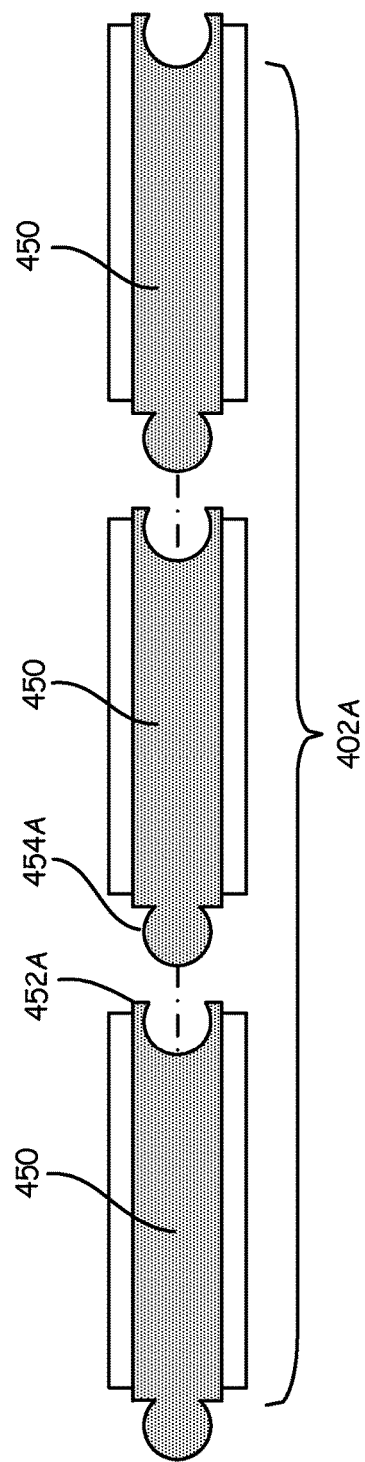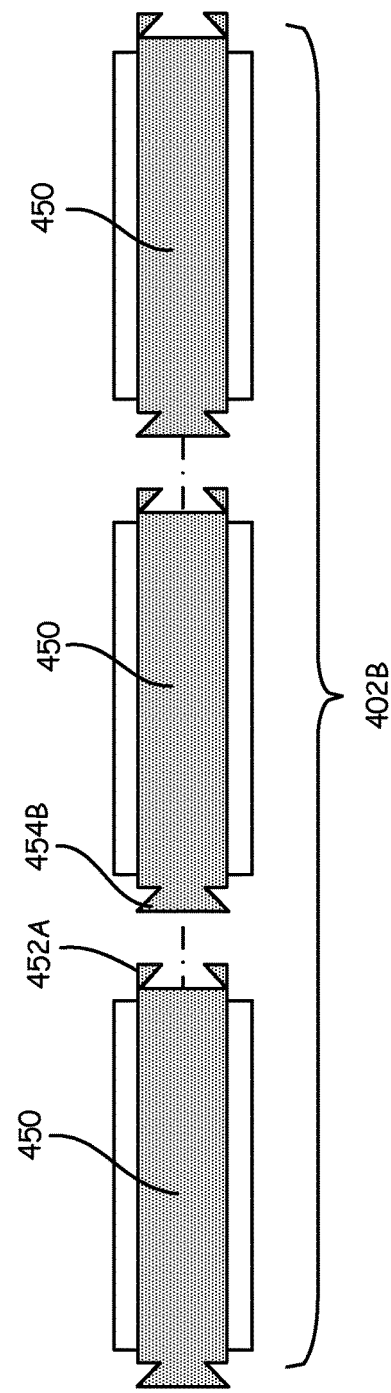
Fig. 5A
Fig. 5B

CONFORMAL ANTENNAS FOR UNMANNED AND PILOTED VEHICLES AND METHOD OF ANTENNA OPERATION

CROSS-REFERENCE TO RELATED APPLICATION(S)

This application claims the benefit of U.S. Provisional Application Ser. No. 62/000,753 filed May 20, 2014, entitled CONFORMAL BODY ANTENNAS FOR UNMANNED AIRCRAFT SYSTEMS AND TRADITIONALLY PILOTED VEHICLES, by Michael Corcoran and Raj Bridgelall.

INCORPORATION BY REFERENCE

The aforementioned U.S. Provisional Application Ser. No. 62/000,753 is hereby incorporated by reference in its entirety.

STATEMENT OF GOVERNMENT INTEREST

This invention was developed with government support under DTOS59-06-G-00046 awarded by the U.S. Department of Transportation. The government has certain rights in the invention.

BACKGROUND

Field of the Invention

The present invention relates generally to antennas, and more specifically to antennas for use on air-, land- or marine-based vehicles that are constructed in physical form-factors that allow functionality of the antennas as the vehicular body, or a part thereof, including structural members, rotating members, and lifting surfaces.

An Unmanned Aircraft System (UAS), interchangeably referred to as an Unmanned Aircraft Vehicle (UAV) or a Remotely Piloted Vehicle (RPV), has a fuselage that primarily serves as the structural and lift-producing airframe component and that enables controlled flight of the UAS within specified operational envelopes and flight conditions appropriate for the category of UAS. Existing vehicular body compositions are designed to provide a structural frame to house electronics, support lifting surfaces (wings, motors, rotors), and carry various types of payload (such as batteries, fuel and avionics).

UAS airframes can provide the necessary enclosure(s) for remote sensing payloads and otherwise critical UAS avionics systems that enable capabilities such as precision navigation, radio communication, environmental systems, and UAS sensor functionality via radio frequency (RF) communications to various ground control stations. Typically, the ground control stations and controlling pilot are located either within Line of Site (LOS) or Beyond Line of Site (BLOS) of the air vehicle, often at great distances from each other. The various fuselage compartments of the UAS may house equipment such as power sources, engines or electric power plants, electronics and antennas that communicate with ground control systems or other airborne aeronautical assets. Generally, the range of a given UAS is constrained by the maximum effective distance of the UAS command links, communications links and onboard fuel/power limitations.

Longer communications range and higher data rates generally require larger antenna surface areas. Yet, the physical dimensions (e.g., size and weight) of large antennas are often not compatible with smaller UAS or their respective capacity ratings.

Therefore, it is desired to integrate relatively large antennas into relatively small UAS without compromising the latter's aerodynamic design features. A solution to such a problem associated with aircraft (whether manned, unmanned, or man-in-the-loop) will have applicability in other settings as well, such as for land- or marine-based vehicles and other RF communications devices.

SUMMARY

An apparatus and method is disclosed for enhancing the communications range and data rate of a system such as an Unmanned Aircraft System (UAS) or other vehicle system by utilizing a body or rotating component of the vehicle as an antenna, and a system for interfacing with the antenna system to produce a phased array, beam steering, or high directionality antenna capability. A whole-body antenna allowing for the viable use of RF-dependent technology when using low-power sensors, greater range, longer endurance and enhanced reliability by reducing overall power consumption, parasitic drag and mean-time-before component failure. Further, in another aspect, a method of generating a directional antenna beam using selected antennas from a larger set of antennas.

The present summary is provided only by way of example, and not limitation. Numerous additional features and benefits of the present invention will be appreciated in view of the description and figures that follow.

BRIEF DESCRIPTION OF THE DRAWINGS

FIGS. 5A and 5B are exploded side views of embodiments of structural panel assemblies of the present disclosure.

Figure 1:
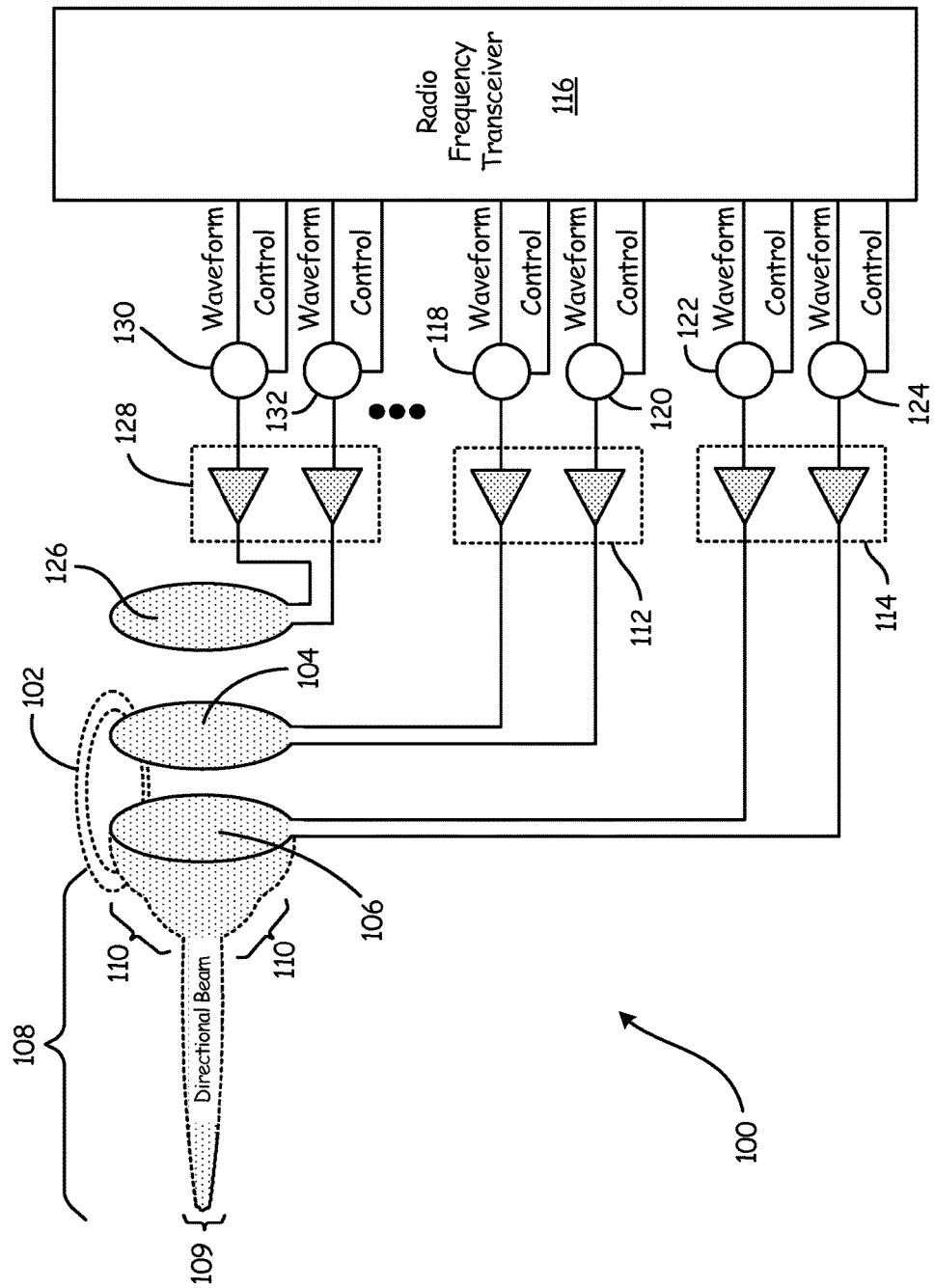
FIG. 1 is a schematic illustration of a phased array antenna and circuit system of the present disclosure.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF THE INVENTION

Disclosed herein is an apparatus and method for enhancing the communications range and data rate of a system such as an Unmanned Aircraft System (UAS) or other vehicle system by utilizing the body or a component, such as a rotating component, of the vehicle as an antenna, along with a system for interfacing with the antenna system to produce a phased array, beam steering, or high directionality antenna capability. Adjusting the construct of the vehicle body to a whole-body antenna allows for the viable use of radio frequency (RF)-dependent technology when using low-power sensors, further allowing for greater range, longer endurance and enhanced reliability by reducing overall power consumption, parasitic drag and mean-time-before component failure.

Also disclosed are a method and apparatus for utilizing the body of a flying object to generate and receive electromagnetic energy; methods for utilizing vehicle body integrated antennas to create larger antenna effective apertures to increase the communications distance; methods for utilizing vehicle body integrated antennas to create larger antenna effective apertures to increase the communications data rate; methods of utilizing movable vehicle components to stir the electromagnetic field generated by the antennas or antenna arrays, thereby increasing the communications effectiveness; a method of utilizing movable vehicle components to stir the electromagnetic field generated by the antennas or antenna arrays, thereby increasing the power transfer effectiveness to passive electronics such as radio frequency identification (RFID) tags; and a method of using the phased array antenna integrated into a vehicle body to steer an electromagnetic beam or to affect the directionality of an electromagnetic beam.

In one embodiment, the system combines conformal sections of fixed vehicle components to produce a single equivalent antenna. The separate antenna sections are driven with a phased array circuit to enable beam steering, or to produce a highly directional electromagnetic (EM) pattern. In another embodiment, the rotating or moving sections of the vehicle such as propellers, wheel rims, ailerons, elevators, and/or rudders allow for the physical movement of antenna beam patterns to augment or supplement the capabilities of electronic beam steering. Physically moving an antenna beam spreads peaks and nulls in the radiated pattern to improve communications reliability through the coverage area. For example, when communicating with backscatter RFID tags, such as those on grazing or resting livestock, it is helpful to physically move around the antenna to improve the reliability of power transfer and reflection. For example, an aircraft on the ground may flap its rudders to stir the EM field and improve readability nearby sensors.

To facilitate ease of construction and cost reduction, each antenna section (or subsection) can be an aggregate of antenna tiles, where individual antennas of the array are shaped as conformal bands and/or tiles positioned on or within the inner surface of a vehicle's body or fuselage (e.g., aircraft fuselage), or an otherwise appropriate segment of the body or fuselage. Rotary sections of the vehicle can be similarly constructed. Utilizing the vehicle body or fuselage as antennas helps reduce the overall vehicle weight while increasing the available antenna surface area.

One aspect of the present invention, with respect to aircraft applications (whether manned, unmanned, or man-in-the-loop), is to replace the conventional fuselage of the aircraft with equivalently shaped antenna arrays constructed and assembled in a manner that provides both structural and electrical requirements for the aircraft. These antenna arrays can be placed into the body (i.e., fuselage), lifting surfaces (e.g., wings), and/or rotating components (e.g. tire rims, propellers) of the aircraft in order to maximize the EM surface area available. The additional surface area becomes available to increase the radiated power and receiving power of the antenna when communicating to distant sensors, such as backscatter RFID tags on livestock or ground sensors in the fields of a farm. It should be appreciated that as a structural component, the same or similar conformal body antenna design suitable for an aircraft application (whether manned, unmanned, or man-in-the-loop) can be utilized for ground-based vehicles, surface-based marine vehicles (water-surface) and sub-surface marine vehicles with substantially equal benefit, adjusting for inherent differences in the structural requirements unique to different modes of transportation. In underwater operations, the larger antenna surface area and its dielectric properties may be adjusted to improve EM communications with tags on sea creatures such as whales.

A practical antenna generally includes a radiating surface and a low impedance source of electrons. An electronic circuit creates electromotive forces that move charges (electric current) in a conductor to produce electric fields (hence magnetic fields) that radiate away from the conductive surface. Efficient radiators have a complex conjugate match with the power amplifier that produces the electric current waveform. The complex conjugate match is provided by adjusting the antenna impedance within the frequency range (bandwidth) of the desired EM transceiver signal. This can be accomplished by adding reactance such as capacitors and inductors, which may themselves be constructed from conformal material that is part of the vehicle surface (see, e.g., U.S. Provisional patent application Ser. No. 61/868,214 by Bridgelall et al., filed Aug. 21, 2013).

Referring to FIG. 1, a schematic illustration of system 100 is provided. EM fields 102 of adjacent antennae 104, 106 (e.g., tiles or bands) interact. Depending on their relative magnitude and phase, a resultant radiated pattern 108 may be amplified in one direction (e.g., for directional beam 109) resulting in a gain and canceled in other directions to result in a null 110. Hence, the purposeful interaction of multiple adjacent antennas 104, 106 can control the predominant direction (i.e., the directional beam 109) of the radiated signal 108 either statically or dynamically, depending on algorithms used in a radio frequency control circuit. This results in the ability to spatially steer the EM radiation of system 100 in three dimensions as illustrated in FIG. 1, in addition to frequency control. Two or more single-ended or differentially driven power amplifiers 112, 114 can induce interacting EM fields 102 around and proximate their respective antennas 104, 106 as shown. The radiated pattern of system 100, in use, contains the desired directional beam 109 but also side-lobes with null areas 110 of the pattern as indicated. The RF transceiver 116 (e.g., one or more microchips) controls a magnitude and phase of antenna current waveforms with phase-shifting elements 118, 120, 122, 124 (governed by waveform and control signal lines) such that the composite radiated pattern 108 is steerable or highly directional, that is, at least directional beam 109 component of pattern 108 is steerable or highly directional. The differential power amplifiers 112, 114 can be generally commercially available radio frequency power amplifier chips, available from numerous manufacturers, or can alternatively be printed electronic circuits or flexible electronic circuits that are layered (e.g., layered onto each tile, as discussed below), for example.

The system 100 can further include one or more additional antennas 126 controlled by the transceiver 116. Each additional antenna 126 can have a differential power amplifier 128, and phase-shifting elements 130, 132. The additional antennas 126 can be positioned in different spatial locations relative to the antennas 104 and 106. As explained further below, the additional antenna(s) 126 can be selectively activated, deactivated, and reactivated, such that an variety of different interacting fields 102 can be generated through control of the selection of active antenna sub-sets (e.g., pairs) to generate radiated signals 108 and directional beams 109, using any of the available antennas 104, 106, 126. It should be noted, however, that the one or more additional antennas 126 and the associated amplifiers 128 and phase-shifting elements 130, 132 can be omitted in alternate embodiments.

An effective aperture $A_e$ of an antenna is a measure of its effectiveness in receiving radiated power, and by reciprocity, its effectiveness in radiating power. The effective aperture $A_e$ is defined as:

$$A_e = \frac{\lambda^2}{4\pi} G_a \quad \text{(Equation 1)}$$

where $\lambda$, is a carrier wavelength and $G_a$ is antenna gain. (Albert A. Smith, Jr. *Radio Frequency Principles and Applications*. New York: The Institute of Electrical and Electronic Engineers, 1998.) The latter ($G_a$) is a measure of the antenna's directionality or sharpness of the predominantly radiated direction. The effective aperture $A_e$ is measured in square-meters. Although not generally related to its physical size, the effective aperture $A_e$ is proportional to the radiating surface area for many antenna types, including dipoles.

A signal power $P_r$ received from a transmitting source located at D meters from the receiving antenna is:

$$P_r = P_t G_t G_r \left(\frac{c}{4\pi D f_c}\right)^2 \quad \text{(Equation 2)}$$

where $G_t$ and $G_r$ are the gains of transmitting and receiving antennas, respectively, and $P_t$ is a signal power for a signal from the transmitting source. A carrier frequency is $f_c$ in units of hertz, and c is the speed of light in meters per second. Substituting Equation 1 into Equation 2 yields:

$$P_r = P_t \frac{A_{et} A_{er}}{\lambda^2} \frac{1}{D^2} \quad \text{(Equation 3)}$$

Equation 3 indicates that the received signal power $P_r$ is directly proportional to the product of the effective apertures of the transmitting and receiving antennas $A_{et}$ and $A_{er}$ respectively, with all else remaining unchanged.

An effective length $l_e$ of an antenna has a direct relationship with a physical size of that antenna. The effective length $l_e$ is defined as:

$$l_e = \frac{V_r}{E_r} \quad \text{(Equation 4)}$$

where $V_r$ is an open-circuit voltage induced across terminals of the receiving antenna and $E_r$ is an electric field strength intercepted by the receiving antenna aperture, measured in volts per meter. An induced voltage is equivalent to the square root of the product of the received power $P_r$ and an effective antenna resistance $R_{ar}$, where:

$$V_r = \sqrt{P_T R_{ar}} \quad \text{(Equation 5)}$$

The electric field strength generated by a net source charge of the transmitting antenna $Q_t$ diminishes with distance D such that:

$$E_r = \frac{k_c Q_t}{D^2} \quad \text{(Equation 6)}$$

where $k_c$ is a Coulomb's law constant that depends on the medium of propagation. (Young, Hugh D., et al. *University Physics with Modern Physics*. 13$^{th}$ Ed. Addison-Wesley, 2011.) A value of $k_c$ in air is approximately $9.0 \times 10^9$ N·m$^2$·C$^{-2}$. Substituting Equation 3 into Equation 5 yields the following expression:

$$l_e = \frac{\sqrt{P_r A_{et} A_{er} R_{ar}}}{k_c \lambda Q_t} D \quad \text{(Equation 7)}$$

Equation 7 demonstrates the direct proportionality between the effective length $l_e$ (size) of the antenna and the communications distance D, with all other factors remaining the same. The effective length $l_e$ is directly proportional to a physical length of the antenna, where a proportionality constant is a function of the antenna type, construction, and material properties of the antenna.

Substituting Equation 6 into Equation 4 demonstrates that for a fixed distance and source electric field strength, increasing the effective antenna length $l_e$ will increase the induced voltage $V_r$ received across the receiving antenna terminals such that:

$$V_r = k_c Q_t \frac{1}{D^2} l_e \quad \text{(Equation 8)}$$

For a fixed level of receiver noise, increasing the voltage $V_r$ received increases the signal-to-noise ratio (SNR). The achievable data rate of the receiver is proportional to the SNR. Those skilled in the art understand that electronic noise has a myriad of sources, including thermal noise, shot noise, burst noise, non-linearity, and numerous others. Using only thermal noise for brevity, the achievable data rate at some acceptable level of bit-error-rate (BER) is proportional to the required SNR, $S_{rn}$, such that:

$$S_m = \frac{V_r}{e_n} = \frac{V_r}{\sqrt{4 \cdot k_B \cdot T \cdot R_{ar} \cdot B}} \quad \text{(Equation 9)}$$

where $e_n$ is the root-mean-square (RMS) value of the noise voltage, $k_B$ is Boltzmann's constant in units of joules per Kelvin, T is the receiver temperature in degrees Kelvin, and B is the receiver bandwidth (i.e., data rate) in hertz. The data rate is directly proportional to the bandwidth and is a function of the bit encoding scheme used, for example, phased-shin-keying (PSK), frequency-shift-keying (FSK), amplitude-shift-keying (ASK), and quadrature amplitude modulation (QAM). Solving Equation 9 for the bandwidth and substituting Equation 8 gives:

$$l_e = D^2 \left(\frac{S_m}{k_c Q_t}\right) \sqrt{4 \cdot k_B \cdot T \cdot R_{ar}} \sqrt{B} \quad \text{(Equation 10)}$$

Hence, Equations 7 and 10 demonstrate that antenna size (effective length $l_e$) is directly proportional to the communications distance D and to the square root of the data rate B respectively, keeping all other factors unchanged.

Figure 2:
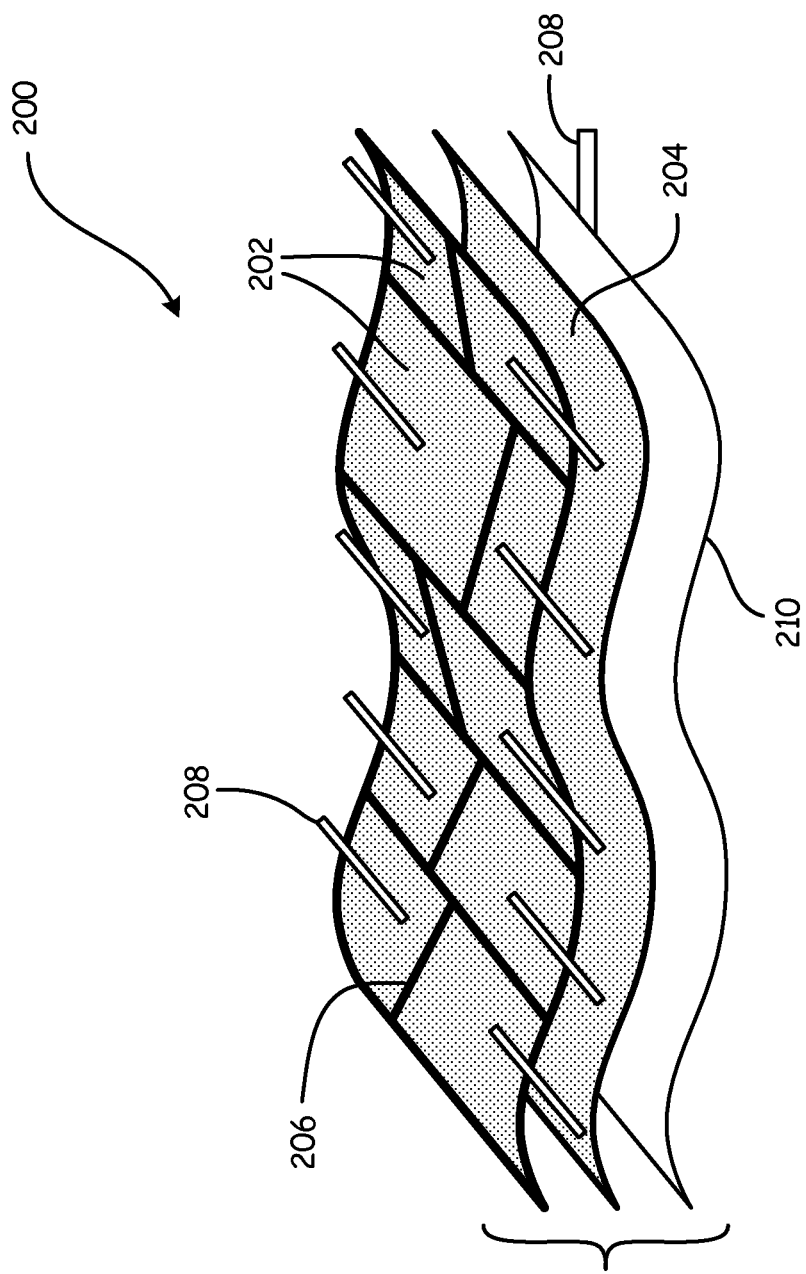
FIG. 2 is an exploded perspective view of an embodiment of an antenna array of the present disclosure.

In an exemplary embodiment of a surface conformal antenna system, collinear antenna arrays 200 are tiles of patch antennas 202 separated by dielectric material 204 and insulator material 206 as shown in FIG. 2. A separate layer, etchings, or overlay material will form the micro-strip transmission lines 208 that feed the antenna 200 with an electric current. The array of antenna patch tiles 202 and their separation can be of different values respectively to implement multi-frequency antenna transceivers or a composite phase array antenna that is capable of spatially steering an EM beam (see, e.g., beam 109 in FIG. 1) from one direction to another direction. Different antenna patch tiles 202 can have different frequency-generating characteristics, such that a resultant frequency of the interacting electromagnetic fields 102 is a function of the frequency-generating characteristics of the active (selected) antenna tiles 202. A ground plane 210 can be integrated as a layer into composite body conformal material of a vehicle, as explained further below. The material choices for each layer are numerous and will depend on their cost and mass production capability. They can range from simple commodity elements such as copper to more complex composite constructions that integrate nano-particles and graphite material.

It should be noted that the patch antenna tiles 202 can each have the same configuration, or have different configurations. The provision of patch antenna tiles 202 of different configurations helps promote flexibility for frequency-agile and spatially agile implementations. Moreover, embodiments of the arrays 200 can provide flexibility in selecting the dielectric material 204, conductive materials of the ground plane 210 and/or the transmission lines 208, and/or the insulator material 206 to suit desired application(s), such as marine-based, aerospace and other types of vehicles. Different tiles 202 can have different material makeups so that portions of a vehicle with which the tiles 202 are used can operate optimally in different environments. For example, an amphibious aerospace vehicle can have tiles 202 of different makeup and can use one or more types of tiles 202 to operate in the water and other one or more types of tiles 202 to operate in the air. The mix of materials of the tiles 202 can accompany an appropriate mix of matching circuits for each amplifier 112, 114, 128 associated with a given tile 202.

Figure 3:
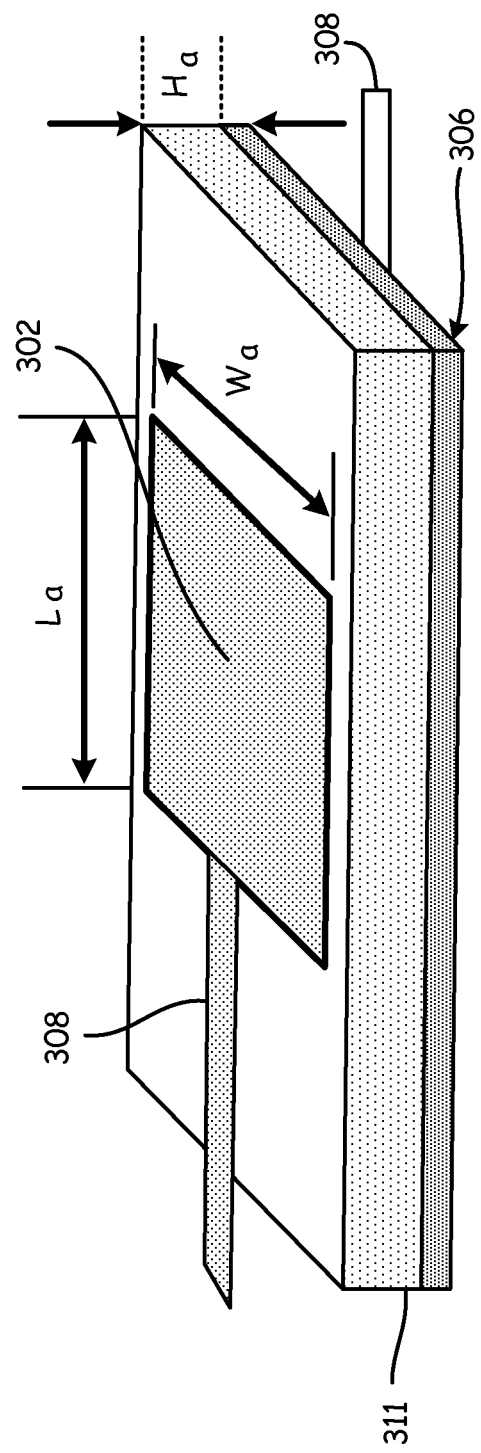
FIG. 3 is a perspective view of an embodiment of a patch antenna assembly of the present disclosure.

Patch antenna 302 sizes, as illustrated in FIG. 3, depends on the carrier frequency $f_c$ and permittivity $\varepsilon_r$ of a substrate 311 such that:

$$L_a \approx \frac{c}{2 f_c \sqrt{\varepsilon_r}} \quad \text{(Equation 11)}$$

The patch antenna 302, ground plane 306, and micro-strip lines 308 should each be constructed with high conductivity material. The patch antenna 302 produces an EM field pattern (see, e.g., pattern 108 in FIG. 1) that is perpendicular to a surface of the patch 302 and radiates away from the ground plane 306. As shown in FIG. 3, the generally rectangular patch antenna 302 has a length $L_a$ and a width $W_a$, and the substrate 311 in which the patch antenna 302 is formed has a height $H_a$.

Figure 4:
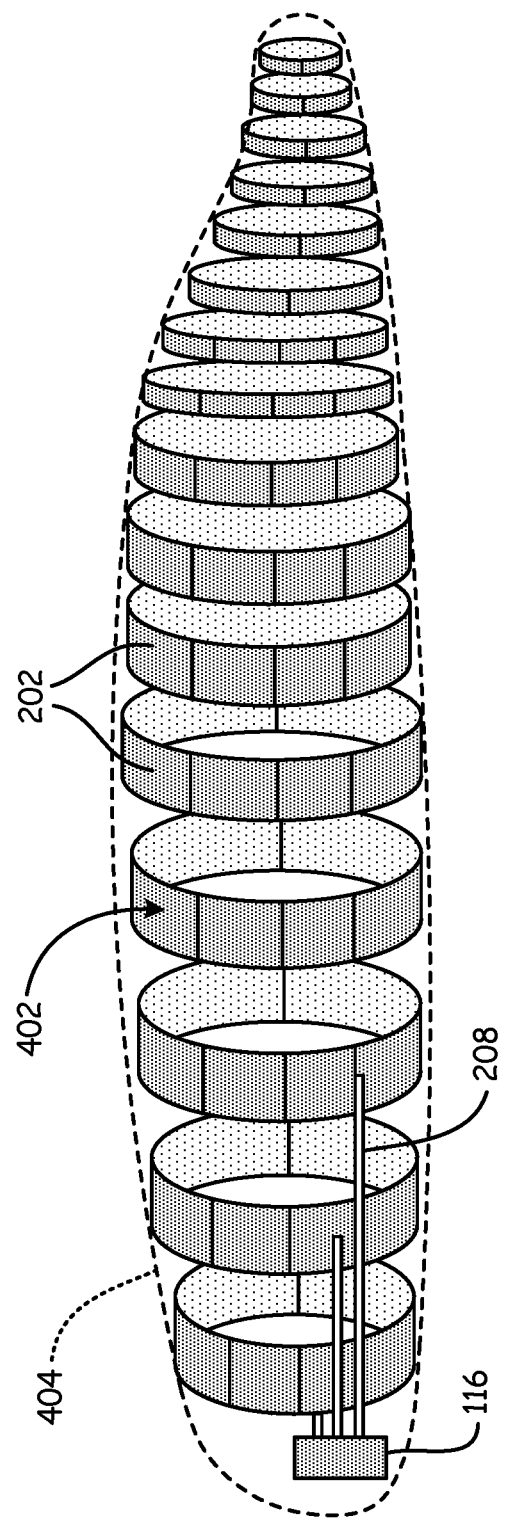
FIG. 4 is a partial cutaway view of an embodiment of a vehicle of the present disclosure.

The antennas 202, 302 can be implemented as aircraft body (fuselage) integrated antennas as shown in FIG. 4. Manufacturers can construct antenna substrates using flexible composite materials or alloys that are consistent with existing technology and manufacturing methods. In one embodiment, materials such as metallic foil or other suitable conducive materials can be used that also provide suitable ground and radiating substrates. These conductive foils can sandwich composite dielectric material to provide the impedance properties needed for the desired antenna effective aperture.

FIG. 4 illustrates one example of the concept of layering flexible material as antenna bands 402 containing tiled patch antennas 202 that can conform to the shape of different parts of a vehicle body perimeter 404 (e.g., aircraft fuselage). Existing manufacturing tools are available to shape and cut flexible plates into appropriately dimensioned bands that will fit as layers within other construction materials (not shown) that can help protect the antenna and provide a suitable exterior and strength for the fuselage, wings, and/or other major components of the aircraft body, as illustrated in the embodiment of an aircraft body construction. Existing techniques can be adopted to create several patch antennas as collinear arrays, with graduated dimensions that conform to the fuselage and wing shapes. These patch arrays will implement multi-frequency, high gain, and beam steerable antennas.

The shaped plates will become bands 402 of antenna material of different dimensions to fit within assembled sections of the vehicle body 404. It should be noted that the term "band" as used herein incorporates nearly any suitable shape, such a full bands (i.e., full rings) or partial bands (i.e., band segments or arcs). All of the antennas 202 can form collinear arrays of antennas to provide greater effective aperture or higher gain composite antennas. The Antennas can alternatively take the form of the patch antenna 302 described above, or have other suitable configurations. Each of the antenna tiles 202 can have associated transmission lines 208 operatively connected to the driver 116 (though for simplicity not all transmission lines 208 are shown). Each of the antenna tiles 202 can be located at a different location or area along the body perimeter 404.

FIGS. 5A and 5B are exploded side views of embodiments of structural panel tiles 450 arranged in bands 402A and 402B, respectively, which can each incorporate one or more patch antennas 202 or 302. The tiles 450 each have coupling mechanisms to interconnect and interlock those tiles. In the illustrated embodiment of FIG. 5A, the tiles 450 in band 402A have a socket 452A at one edge and a ball 454A at another edge, such that adjacent tiles 450 can be interlocked together. The coupling mechanism can be integrally formed with the tile 450. In the illustrated embodiment of FIG. 5B, the tiles 450 in band 402B have a socket 452B at one edge and a dovetail 454B at another edge, such that adjacent tiles 450 can be interlocked together. It should be noted that the embodiments shown in FIGS. 5A and 5B are provided merely by way of example and not limitation. Various other shapes and configurations are possible, such as fir-tree, rounded dovetail, mortise-and-tenon, jigsaw puzzle shape, and other suitable coupling mechanisms can be utilized in further embodiments. The illustrated embodiments of FIGS. 5A and 5B illustrate essentially two-dimensional coupling mechanisms. Other two-dimensional coupling mechanisms can have similar shapes but be arranged in other orientations relative to the tiles 450, such as by modifying the illustrated coupling mechanisms from side to top engaging orientations. Moreover, three-dimensional variations of the illustrated coupling mechanisms having more complex shapes for accomplishing interlocking can also be utilized in alternate embodiments.

Figure 6:
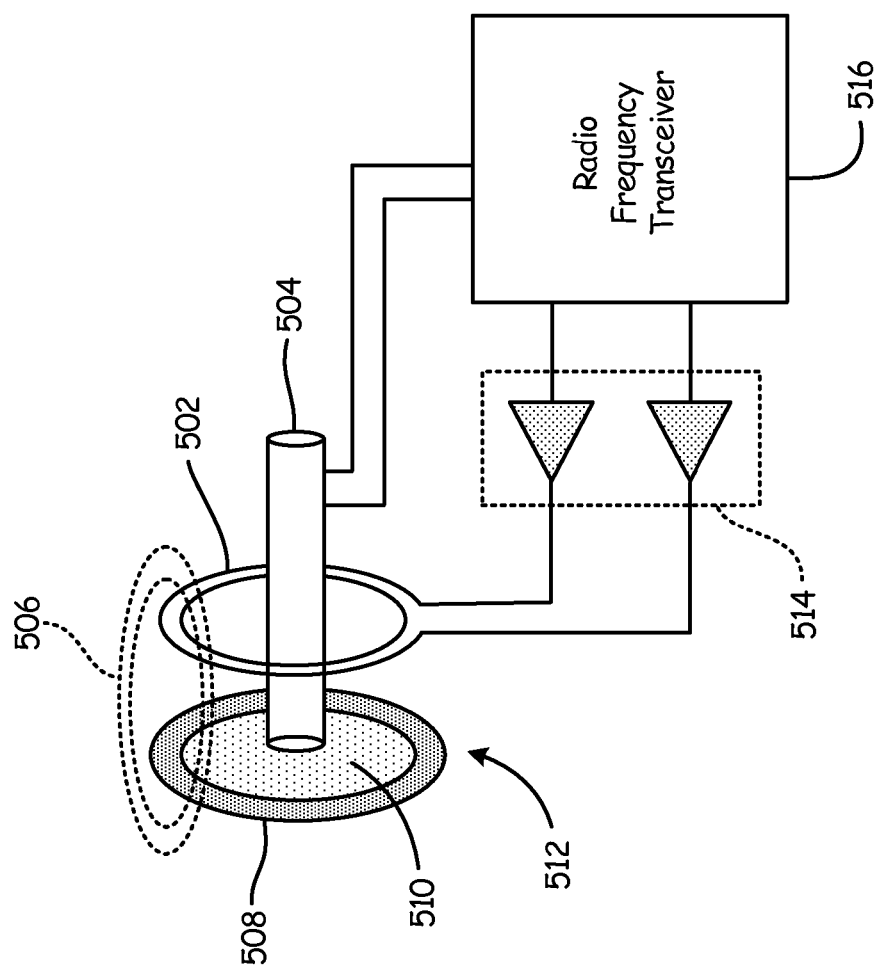
FIG. 6 is a schematic drawing of an alternate embodiment of a phased array antenna and circuit system of the present disclosure.

In addition or in the alternative, rotating structures about a vehicle can incorporate antenna materials in layers without impeding their functionality, such as in providing lift and controllability for an aircraft application. FIG. 6 shows one such embodiment. A primary antenna coil 502 in a stationary portion around a rotating axle 504 carries an oscillating electric current that induces a magnetic field 506, which in turn induces an electric current in a secondary antenna coil 508 that is conformal (i.e., integrated with) with the rotating structure. The induced current drives an antenna element 510 located on the rotating structure 512, such as a wheel hub or a propeller of a vehicle. A differential power amplifier electronic driver 514 is shown as the means of generating an electric current in the primary coil 502, and can in turn be controlled by a radio frequency transceiver 516. The secondary coil can also be controlled by the transceiver 516 through appropriate slip ring, brushes or other rotational electrical connections (not shown).

It should be noted that the particular configurations of the vehicle body 404 (fuselage) shown in FIG. 4 and the rotating element 512 shown in FIG. 6 are provided merely by way of example and not limitation. Any desired number of individual antenna bands each of any desired shape and size can be used in a particular application. Moreover, in order to provide an a larger effective aperture antenna or a phased array antenna, nearly any number of antenna bands and/or band segments can be electrically associated as a composite antenna and driven together with a radio frequency transceiver. For example, one or more antenna bands or band segments can be utilized individually or in aggregate to provide a variety of antenna functionality requiring different directionality, polarization, bandwidth, reflection coefficient, impedance, and radiation pattern. Also, each antenna band or patch element in a band can have any suitable configuration, allowing each individual band to have the same or different constructions (e.g., using the same or different materials, etc.). When used in aggregate, particular groups of antenna bands can be fixed for particular functions. For instance, a given application could essentially "hard wire" a particular function for a particular aggregate group of antenna bands. Alternatively, or in addition, a power distribution panel can be used to flexibly (i.e., dynamically) select one or more antenna bands for service to a particular function at different times during service life (e.g., during flight, or while taxiing). In particular, during ground travel, wing and rudder elements can be flapped to "stir" the EM fields while reading nearby ground sensors.

Figure 7A:
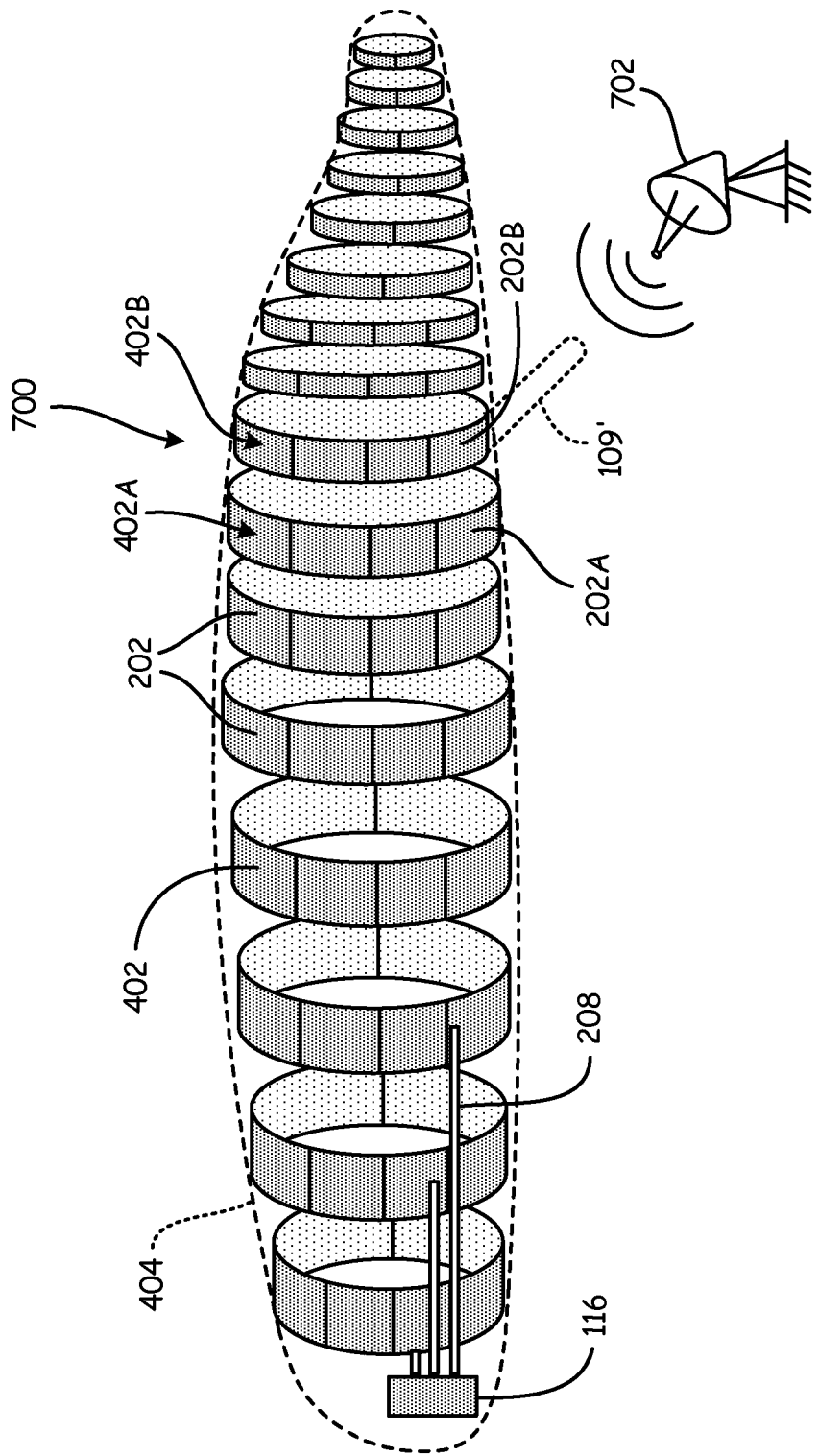
FIGS. 7A-7C are schematic illustrations of an antenna array assembly shown in different use scenarios according to the present disclosure.
Figure 7B:
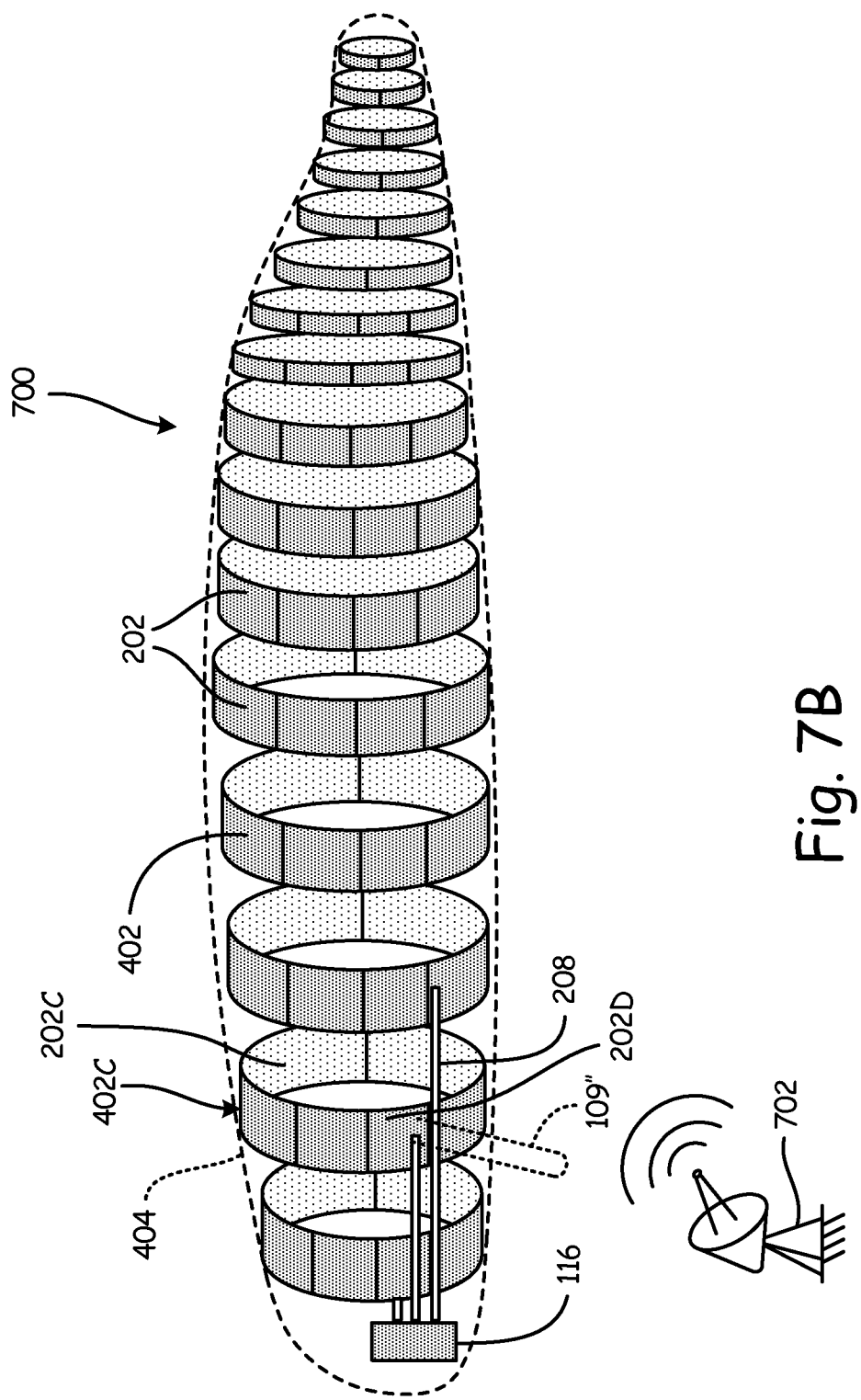
Figure 7C:
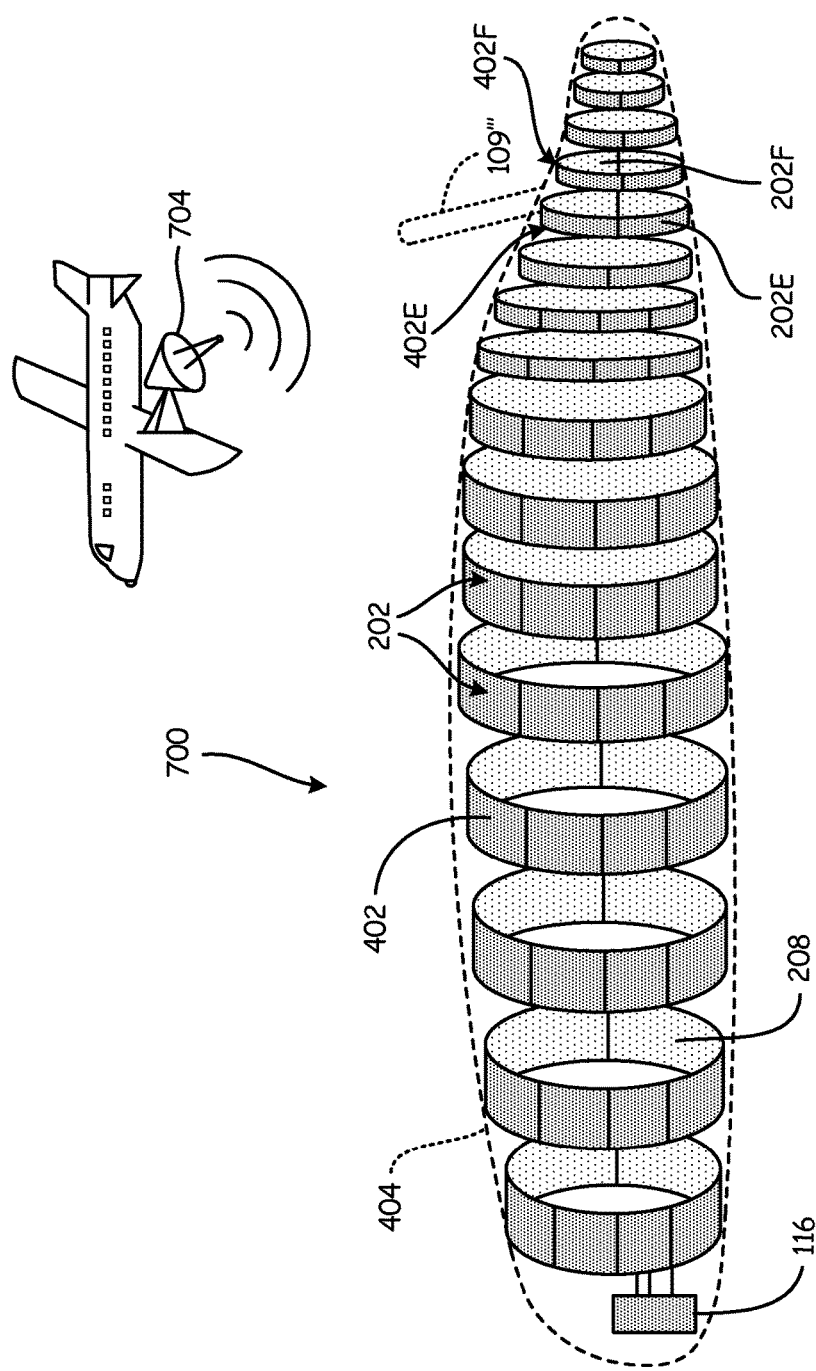

FIGS. 7A-7C are schematic illustrations of an antenna array assembly 700 shown in different use scenarios. In FIG. 7A, antenna tiles 202 are carried by an airborne vehicle (which can be configured like that described above with respect to FIG. 4) that is airborne above a ground-based transceiver device 702. In the illustrated embodiment of FIG. 7A, antenna tiles 202A and 202B from a pair of adjacent bands 402A and 402C are selected to generate a directional beam 109' that is spatially oriented toward the ground-based transceiver device 702 (for simplicity, the interacting fields 102 are not shown). The antenna tiles 202A and 202B are located adjacent one another, along the same side of the body perimeter 404. Other tiles can be unused, or used to generate other beams (not shown). In the illustrated embodiment of FIG. 7B, the airborne vehicle is in a different position relative to the ground-based transceiver device 702. Accordingly, a different pair of antenna tiles 202C and 202D are selected to generate a directional beam 109'' that is spatially oriented toward the ground-based transceiver device 702 (for simplicity, the interacting fields 102 are not shown in FIG. 7B). Other tiles can be unused, or used to generate other beams (not shown). In the illustrated embodiment of FIG. 7B, the tiles 202C and 202D are located opposite one another across the body perimeter 404 (and an internal cavity thereof) on a single band 402C. In FIG. 7C, the airborne vehicle communicates with an airborne transceiver device 704. In the illustrated embodiment of FIG. 7C, another pair of antenna tiles 202E and 202F on adjacent bands 402E and 402F are selected to generate a directional beam 109''' (for simplicity, the interacting fields 102 are not shown). The antenna tiles 202E and 202F are located at opposite sides of the body perimeter 404 (and across an internal cavity thereof) in the illustrated embodiment. Other tiles can be unused, or used to generate other beams (not shown). It will understood by those of ordinary skill in that art that the illustrated use case embodiments of FIGS. 7A-7C are provided merely by way of example and not limitation. A variety of different antenna tile pairs can be selected as desired to create spatially agile antenna beams that are arranged at nearly any possible orientation relative to the body perimeter 404. Such antenna tile pairs can be selected from a single band, adjacent bands, or bands spaced apart from each other.

Figure 8:
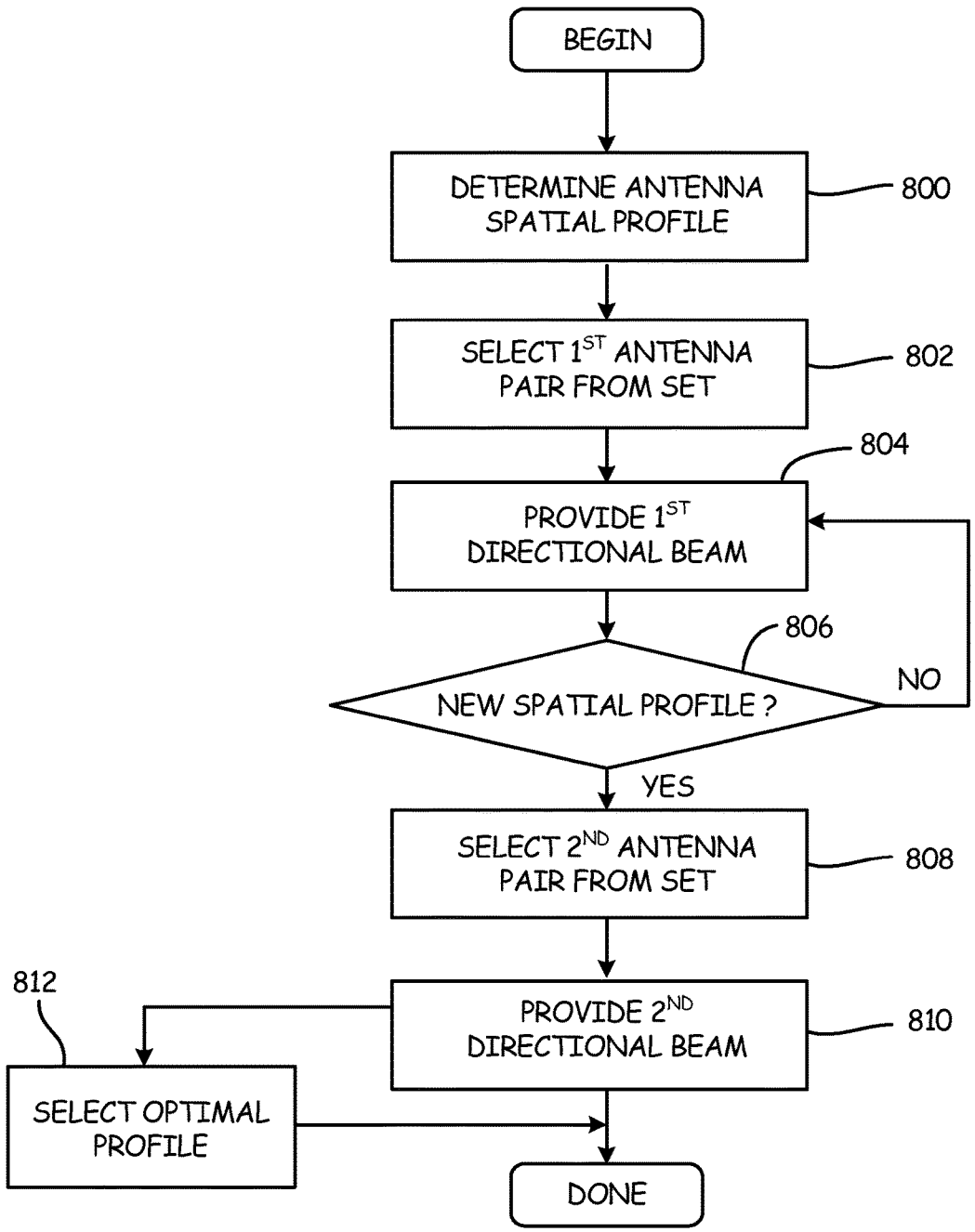
FIG. 8 is a flow chart of a method of operating an antenna array system according to the present disclosure.

FIG. 8 is a flow chart of a method of operating an antenna array system. Initially, an antenna spatial profile can be determined (Step 800). In some instances, a desired antenna spatial profile can be determined based on available data, such as knowing an approximate location of the antenna array system and a remote transceiver device with which it is desired to communicate. Use of a lookup table or other database can be used to facilitate such profile selection. In other instances, a desired antenna spatial profile may need to be determined, such as through an iterative protocol that involves making a number of preliminary selections and assessing performance feedback to make a final selection that yields optimal antenna performance, in which case the initial antenna spatial profile can be merely a temporary, nominal selection made as part of the larger protocol.

Next, a first antenna pair (or other sub-set of multiple antennas) is selected from a set of available antennas as a function of the antenna spatial profile (Step 802). The set of available antennas can include at least three antennas. The selected antennas can be located adjacent one another on a single band, on adjacent bands, on bands spaced from one another, on opposite sides of a vehicle body (or fuselage), etc. The antenna spatial profile can be correlated to the spatial relationship between the antenna locations. At Step 802, other unselected antennas in the set can remain unused, or can be used for other purposes (e.g., to generate other directional antenna beams). A first directional beam is then provided by the first pair of antennas, which can be generated in accordance with the antenna spatial profile and associated interacting EM fields generated by the selected antennas (Step 804). It should further be noted that as described herein, the selection of a pair of antennas does not preclude the active use of additional antennas (i.e., more than two antennas) as part of a common antenna assembly to generate the first directional beam. That is, the example given with respect to a pair (i.e., two) antennas is provided merely by way of example and not limitation. The disclosed method is also applicable to embodiments in which sub-sets of more than two antennas are used to generate interacting fields and a given directional antenna beam.

A decision can then be made as to whether a new antenna spatial profile is desired (Step 806). For example, if communication with a different remote transceiver device is desired, or if communication signal quality is degraded over time (e.g., due to movement of the antenna array system, interference, etc.), it may be desired to determine a new antenna spatial profile. Moreover, if the first antenna spatial profile was merely a preliminary selection as part of a protocol for spatial profile optimization, the new antenna profile can be selected as part of that protocol. Such a protocol can involve serialized profile selections, and/or selections made concurrently (i.e., in parallel). If no new antenna profile is desired, the method can continue to generate the first direction beam using the first antenna pair. If a new antenna special profile is desired, a second pair of antennas can be selected from the set as a function of the new antenna spatial profile (Step 808). The second pair of antennas can be entirely different antennas, or can include one of the antennas from the first pair. Then a second directional beam can be provided by the second pair of antennas, which can be generated in accordance with the new antenna spatial profile (Step 810). Any number of additional antenna spatial profiles can be selected with the method as desired, though only two such profiles are depicted in FIG. 8 for simplicity.

In embodiments in which the protocol for selecting an optimal antenna spatial profile is desired, an additional algorithm can optionally be performed to select an optimal antenna spatial profile (Step 812). The algorithm of Step 812 can involve comparing a performance characteristic, such as signal strength and/or quality, between at least the first and second directional beams, and the higher performing spatial profile can be selected for further use. In some instances, the algorithm can apply a threshold such that once a spatial profile that meets a given threshold is identified, further feedback from other antenna pairs is not needed, thereby potentially shortening the time and resources consumed in identifying a suitable antenna spatial profile and corresponding antenna pair. In embodiments were a protocol for antenna selection is not desired, Step 812 can be omitted.

It should further be noted that the method illustrated in FIG. 8 can further include antenna frequency selection. Different antennas can have different EM frequency-generating characteristics, and selection of antennas can include generating different resultant frequencies of the directional beam through selection of sub-sets of antennas with desired frequency-generating characteristics. Antenna frequency selection is well understood, and therefore not explained further here and not explicitly illustrated in FIG. 8. However, it is noted that such frequency agile selection can be combined with the spatially-agile antenna selection described above in a novel manner.

Moreover, the method illustrated in FIG. 8 can further include spatial beam steering for any given directional antenna beam, as previously discussed. For instance, modulation of induced currents in selected sub-sets of available antennas governed by a transceiver can adjust characteristics of interacting EM fields and the resultant radiated EM pattern to help accomplish beam steering. Moreover, the selective activation (or deactivation) of one or more additional nearby antennas can be used to modify the interacting fields and the resultant radiated EM pattern, which can help accomplish beam steering. Beam steering can be used in addition or in the alternative to selection of different antenna groupings to achieve a desired directional beam spatial profile in various embodiments. In some applications, an algorithm can be implemented to compare beam steering performance to antenna selection performance based on temporary uses and performance feedback from an associated selection protocol in order to help optimize the directional beam spatial profile for further use under given conditions (in a manner similar to the algorithm of Step 812).

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by operational conditions, incidental current fluctuations, transient signal fluctuations caused by noise, and the like.

Furthermore, while the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the spirit and scope of the present disclosure given its broadest interpretation.

The invention claimed is:

1. A vehicle comprising:
   a body providing structural support and defining a fuselage perimeter, wherein the body includes a plurality of annular bands that are separated axially along a primary axis of the body and distributed axially across substantially the entirety of the fuselage perimeter, wherein the plurality of bands conform to a shape of the perimeter;
   a plurality of antennas integrated into the plurality of bands, each antenna conforming to the shape of the perimeter along a corresponding band; and
   a transceiver operatively connected to each of the plurality of antennas, the transceiver configured to power selected sub-sets of the plurality of antennas to generate a directional antenna beam,
   wherein multiple ones of the plurality of antennas are located on and distributed across a single layer of each of the plurality of bands, the antennas on a given one of the plurality of bands separated from adjacent antennas in the single layer by electrically insulating material.

2. The vehicle of claim 1, wherein each of the plurality of antennas comprises a patch antenna.

3. The vehicle of claim 1, wherein each of the plurality of bands comprises:
   a ground plane;
   a layer of dielectric material adjacent to the ground plane; and
   a first patch antenna tile on the layer of dielectric material and opposite the ground plane, the patch antenna tile forming one of the plurality of antennas.

4. The vehicle of claim 3, each of the plurality of bands further comprising:
   a second patch antenna tile on the layer of dielectric material and opposite the ground plane, wherein the second patch antenna tile is separated from the first patch antenna tile by an electrically insulating material.

5. The vehicle of claim 1, wherein at least one of the plurality of bands comprises interlocking tiles of composite material having integral coupling structures.

6. The vehicle of claim 1, wherein the body comprises a fuselage of an aircraft.

\* \* \* \* \*